(12) United States Patent
Thornton et al.

(10) Patent No.: US 7,414,582 B1
(45) Date of Patent: Aug. 19, 2008

(54) METHOD AND APPARATUS FOR ALL-POLARIZATION DIRECTION FINDING

(75) Inventors: Steven D. Thornton, Rockwall, TX (US); Dennis J. Close, Heath, TX (US); Mark L. Kargel, Rockwall, TX (US); Steven P. Stanners, Rowlett, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 327 days.

(21) Appl. No.: 11/368,155

(22) Filed: Mar. 3, 2006

(51) Int. Cl.
*G01S 5/02* (2006.01)
*G01S 5/04* (2006.01)
*H01Q 21/06* (2006.01)

(52) U.S. Cl. .................. 342/423; 342/362; 342/432
(58) Field of Classification Search ......... 342/361–366, 342/417–449
See application file for complete search history.

(56) References Cited

U.S. PATENT DOCUMENTS

| 4,121,216 A | 10/1978 | Bunch et al. |
| 6,140,963 A * | 10/2000 | Azzarelli et al. ............ 342/442 |
| 7,268,728 B1 * | 9/2007 | Struckman ................ 342/424 |

OTHER PUBLICATIONS

A.J. Weiss et al., Manifold interpolation for diversely polarised arrays, IEE Proceedings of Radar Sonar and Navigation, vol. 141(1), p. 19-24, Feb. 1994.*
Ralph O. Schmidt, *Multilinear Array Manifold Interpolation*, IEEE Transactions On Signal Processing, vol. 40, No. 4, Apr. 1992, at 857.
Brian G. Agee, *The Copy/DF Approach to Signal-Specific Emitter Location*, IEEE, 1991, at 994.
Brian G. Agee and Robert A. Calabretta, *ARMA-Like and ML-Like Copy/DF Approaches for Signal-Specific Emitter Location*, IEEE, 1990, at 134.

* cited by examiner

*Primary Examiner*—Thomas H. Tarcza
*Assistant Examiner*—Fred H. Mull
(74) *Attorney, Agent, or Firm*—Hovey Williams LLP

(57) ABSTRACT

Embodiments of the present invention provide a method and apparatus for all-polarization direction finding. The method and apparatus generally include acquiring measurements at least partially corresponding to an emitted signal and generated utilizing a blind signal extraction algorithm, forming an all-polarization cost function utilizing the acquired measurements, and determining an angle of arrival for the emitted signal utilizing the formed all-polarization cost function. Such a configuration enables angles of arrivals to be easily determined for signals having any polarization without using a multiple signal classification (MUSIC) algorithm.

16 Claims, 5 Drawing Sheets

METHOD AND APPARATUS FOR ALL-POLARIZATION DIRECTION FINDING

COMPUTER PROGRAM LISTING APPENDIX

A computer program listing appendix containing the source code of a computer program that may be used with the present invention is incorporated herein by reference and appended hereto as one (1) original compact disc, and an identical copy thereof, containing a total of two files as follows:

| Date of Creation | Size (Bytes) | Filename |
| --- | --- | --- |
| Oct. 23, 2005 | 1,398 | apl_mldf.m |
| Jan. 10, 2006 | 1,412 | apl_mldf3.m |

BACKGROUND OF THE INVENTION

1. Field of the Invention

The present invention relates to signal tracking. More particularly, the invention relates to a method and apparatus for all-polarization direction finding that utilizes signal measurements provided by a blind signal extraction algorithm.

2. Description of the Related Art

The ability to determine the source geolocation of emitted signals is becoming increasingly important as the use of wireless communications devices becomes commonplace throughout the world. For example, the U.S. Federal Communications Commission Enhanced 911 (E911) rules will eventually require cellular telephone carriers to identify the geolocations, i.e. the physical source locations, of subscribers who place calls to 911. Additionally, wireless communication device users often desire to acquire accurate geolocations for navigation purposes, such as to generate a route between a current location and a destination. Further, military and law enforcement agencies often desire to locate sources of emitted signals for tracking and targeting purposes.

Methods and devices have been developed that enable signal geolocations to be determined. Some of these methods include utilizing Global Position System (GPS) elements that must be coupled with signal emitters to determine geolocations, thereby increasing system cost and complexity. Other methods include utilizing one or more collector elements, such as antennas, to generate signal measurements and compute geolocations utilizing the generated signal measurements.

Although utilizing signal measurements enables geolocations to be determined without physically interfacing with signal emitters, such methods often require, utilize, or present information concerning the angle of arrival (AOA) of emitted signals. Unfortunately, developed methods of calculating AOA require signals to be exclusively vertically or horizontally polarized or require the use of algorithms such as the multiple signal classification (MUSIC) algorithm. As signals are often not exclusively vertically or horizontally polarized and the MUSIC algorithm requires knowledge of how many signals are in the environment and is generally inoperable to utilize measurements provided by blind signal extraction algorithms, signal tracking methods are often inhibited when faced with diversely polarized signals.

SUMMARY OF THE INVENTION

The present invention solves the above-described problems and provides a distinct advance in the art of signal tracking. More particularly, the invention provides a method and apparatus for all-polarization direction finding that utilizes signal measurements provided by a blind signal extraction algorithm. Such a configuration enables angles of arrivals to be easily calculated for signals having any polarization without using a MUSIC algorithm.

In one embodiment, the present invention provides a method of determining an angle of arrival for an emitted signal having any polarization. The method generally includes acquiring measurements at least partially corresponding to the emitted signal and generated utilizing a blind signal extraction algorithm, forming an all-polarization cost function utilizing the acquired measurements, and determining the angle of arrival for the emitted signal utilizing the formed all-polarization cost function.

In another embodiment, the present invention provides a computer-readable medium encoded with a computer program for determining an angle of arrival for an emitted signal having any polarization. The computer program is stored on a computer-readable medium for operating a computing element and generally includes a code segment operable to acquire measurements at least partially corresponding to the emitted signal and generated utilizing a blind signal extraction algorithm, a code segment operable to form an all-polarization cost function utilizing the acquired measurements, and a code segment operable to determine the angle of arrival for the emitted signal utilizing the formed all-polarization cost function.

In another embodiment, the present invention provides a computing element operable to determine an angle of arrival for an emitted signal having any polarization. The computing element generally includes a memory and a processor coupled with the memory. The memory is operable to store measurements at least partially corresponding to the emitted signal and generated utilizing a blind signal extraction algorithm. The processor is operable to form an all-polarization cost function utilizing stored measurements and determine the angle of arrival for the emitted signal utilizing the formed all-polarization cost function.

Other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 1:
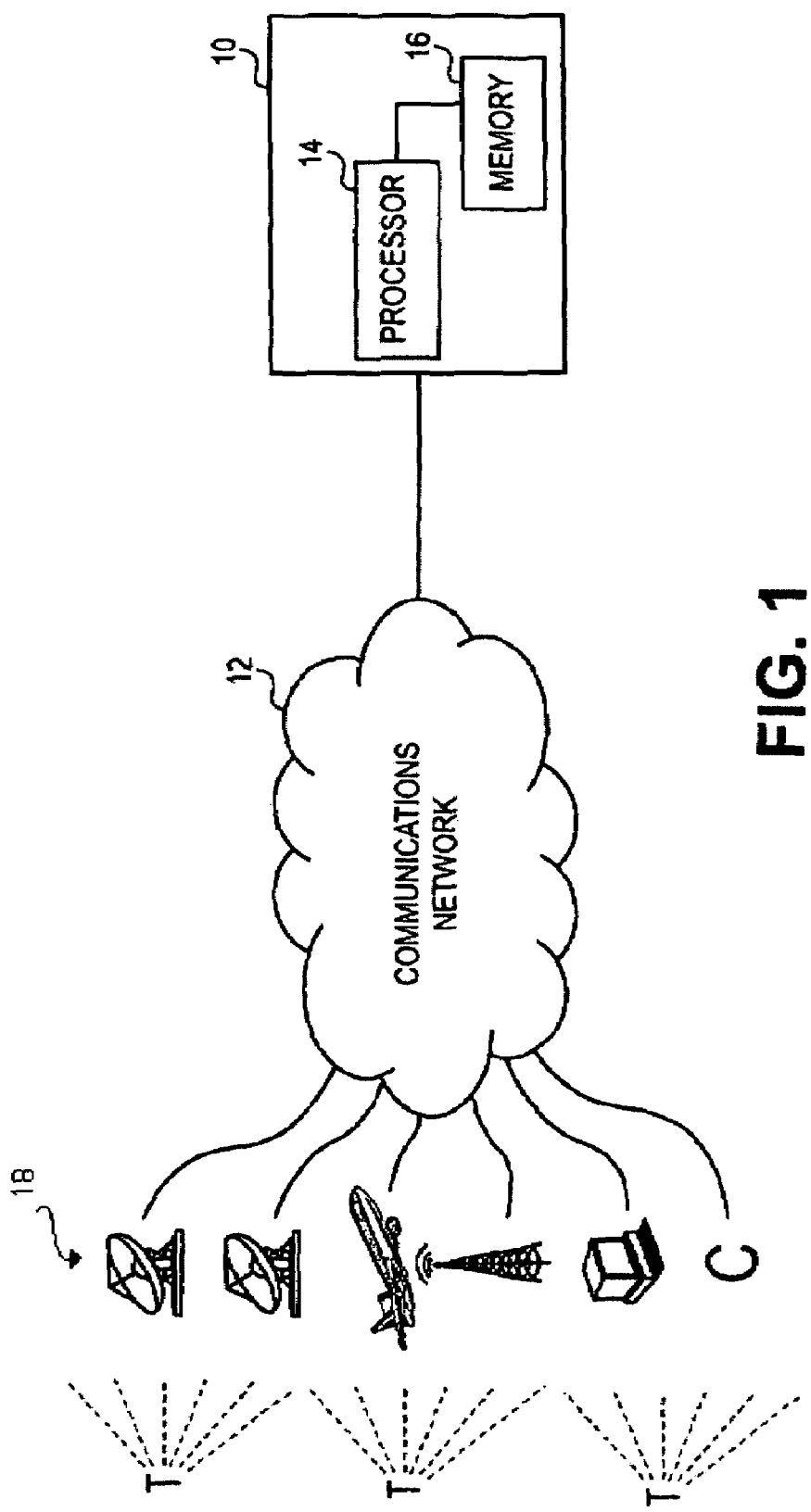
FIG. 1 is a block diagram of some of the elements operable to be utilized by various embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE PREFERRED EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Methods consistent with the present teachings are especially well-suited for implementation by a computing element 10, as illustrated in FIG. 1. The computing element 10 may be a part of a communications network 12 that enables various devices to exchange information and data. The computing element 10 may include a processor 14 coupled with a memory 16 to perform the various functions described herein. As should be appreciated, the processor 14 and memory 16 may be integral or discrete and comprise various conventional devices, such as microcontrollers, microprocessors, programmable logic devices, etc. Further, the computing element 10 may include additional devices, such as a display for indicating processed information, such as a geolocation or angle of arrival, or additional processing and memory elements. Further, the computing element 10 may comprise a plurality of computing elements or a network of computing elements such that one or more portions of the invention may be implemented utilizing a first computing element and one or more other portions of the invention may be implemented utilizing a second computing element.

The present invention can be implemented in hardware, software, firmware, or combinations thereof. In a preferred embodiment, however, the invention is implemented with a computer program. The computer program and equipment described herein are merely examples of a program and equipment that may be used to implement the present invention and may be replaced with other software and computer equipment without departing from the scope of the present teachings. It will also be appreciated that the principles of the present invention are useful independently of a particular implementation, and that one or more of the steps described herein may be implemented without the assistance of the computing element 10.

Computer programs consistent with the present teachings can be stored in or on a computer-readable medium residing on or accessible by the computing element 10, such as the memory 16, for instructing the computing element 10 to implement the method of the present invention as described herein. The computer program preferably comprises an ordered listing of executable instructions for implementing logical functions in the computing element 10 and other computing devices coupled with the computing element 10. The computer program can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions.

The ordered listing of executable instructions comprising the computer program of the present invention will hereinafter be referred to simply as "the program" or "the computer program." It will be understood by persons of ordinary skill in the art that the program may comprise a single list of executable instructions or two or more separate lists, and may be stored on a single computer-readable medium or multiple distinct media.

In the context of this application, a "computer-readable medium", including the memory 16, can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disc (CD) or a digital video disc (DVD). The computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

As shown in FIG. 1, the computing element 10 is preferably directly or indirectly coupled with one or more collector elements 18 to enable function of the present invention as described herein. It should be appreciated the computing element 10 and the collector elements 18 may be integral such as where one or more of the collector elements 18 are operable to independently perform signal tracking as described herein. Thus, the computing element 10 and collector elements 18 need not necessarily be coupled through the communications network 12 with other devices or collector elements to enable operation of the present invention.

The collector elements 18 may include any devices or elements that are operable to detect and/or otherwise receive an emitted electromagnetic signal. Thus, the collector elements 18 may include stationary and non-stationary antennas, uni-directional and omni-directional antennas, electrical elements operable to relay a signal, etc. In various embodiments the collector elements 18 may comprise a plurality of communication towers, such as cellular-phone towers, associated via the communications network 12. Thus, the present invention is not limited to the utilization of only one type or configuration of collector elements 18.

Figure 3:
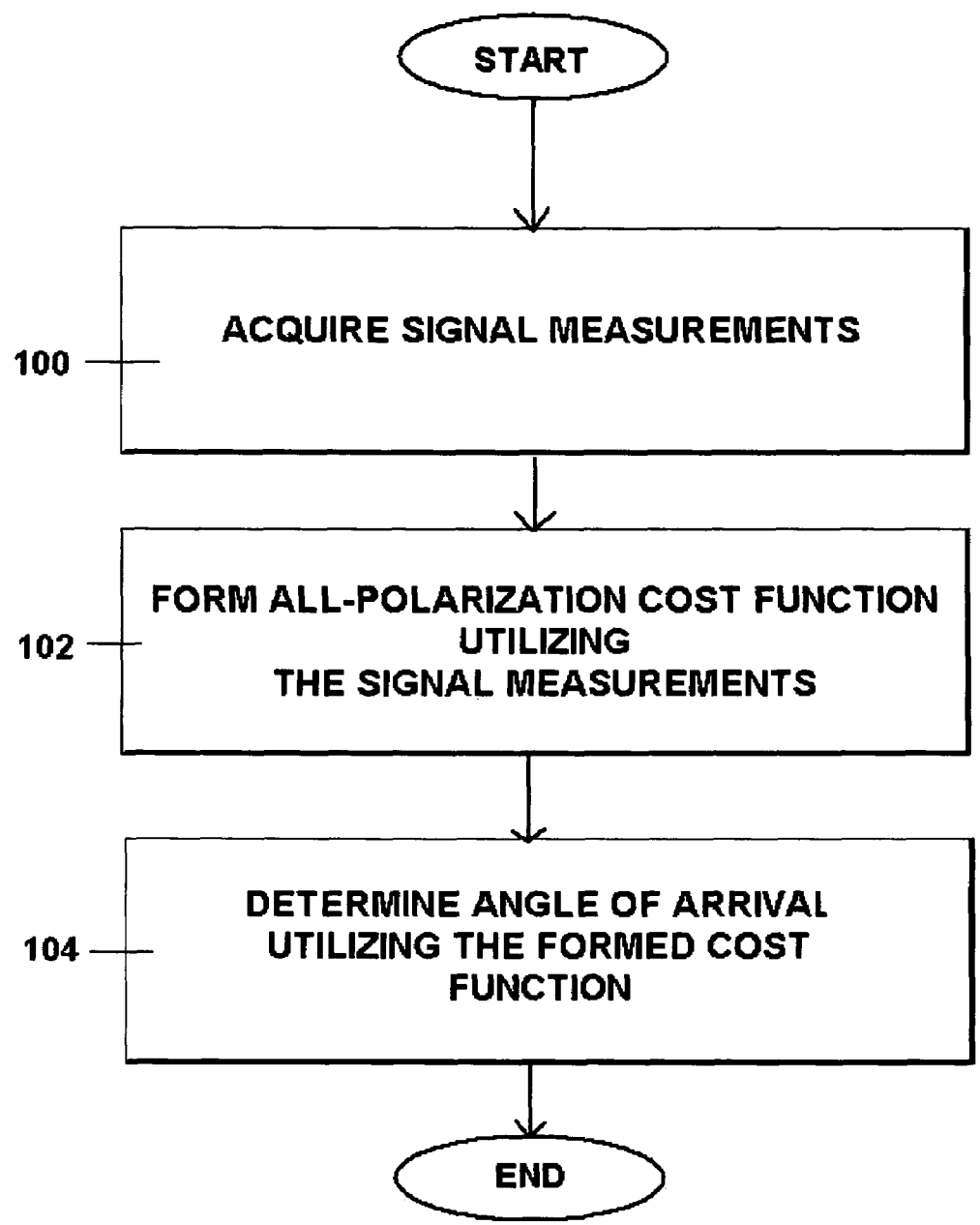
FIG. 3 is a flow chart showing some of the steps operable to be performed by the present invention.

A flowchart of steps that may be utilized by the present invention to determine an angle of arrival is illustrated in FIG. 3. Some of the blocks of the flow chart may represent a module segment or portion of code of the computer program of the present invention which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality.

In step 100, measurements at least partially corresponding to an emitted signal are acquired. The present invention may acquire the measurements utilizing various methods, including utilizing one or more of the collector elements 18 to detect and/or receive the signal, retrieving the measurements through the communications network 12 from one or more of the collector elements 18 and/or computing elements, retrieving the measurements from the memory 16, etc. Thus, the present invention is not required to directly measure the emitted signal to acquire the measurements.

Preferably, the measurements corresponding to the emitted signal are at least partially generated by the computing element 10, or by other devices accessible through the communications network 12, utilizing a blind signal extraction algorithm. The blind signal extraction algorithm generally produces signal measurements that can be used by one or more signal specific direction finding (DF) algorithms, such as a Maximum Likelihood Direction Finding (MLDF) algorithm. As is known in the art, MLDF algorithms advantageously utilize blind signal extraction algorithms to determine an angle of arrival (AOA) for emitted signals.

The measurements corresponding to the emitted signal may be generated with any blind signal extraction algorithm operable to be utilized by MLDF algorithms or any other signal specific DF algorithm. Thus, the blind signal extract algorithm may correspond to a spectral self-coherence restoral (SCORE) algorithm if the emitted signal is spectrally self-coherent at known values of frequency separation, a multi-target constant modulus algorithm (MT-CMA) if the emitted signal has a sufficiently low modulus variation, a DMP algorithm, a 2D RAKE algorithm, combinations and variations thereof, etc.

In various embodiments, the measurements corresponding to the emitted signal include a weight vector w to facilitate determination of the cost function in step 102. Both w and $\vec{w}$ are utilized interchangeably herein to represent the weight vector w. The weight vector w may be conventionally generated by the blind signal extraction algorithm for utilization in direction finding. For instance, the blind signal extraction algorithm may generate the weight vector w by maximizing the signal-to-interference-noise-ration (SINR) of the emitted signal. The weight vector w preferably corresponds to weight vectors utilized in signal specific DF algorithms, such as ML-like copy/DF MLDF algorithms.

In various embodiments, the measurements may also include calibration measurements. The calibration measurements preferably include at least one array calibration vector a to facilitate formation of the cost function in step 102 and determination of the AOA in step 104. Both a and $\vec{a}$ are utilized interchangeably herein to represent the array calibration vector a. The array calibration vector a is preferably a function of azimuth (θ) and depression angle (φ) such that the array calibration vector a may be represented as a(θ, φ).

Preferably, the calibration measurements include two diversely polarized array calibration vectors, $a_h$ and $a_v$, respectively corresponding to a horizontal calibration vector and a vertical calibration vector. As should be appreciated, the present invention is not limited to horizontal and vertical polarizations, as right-circular, left-circular, and other signal polarizations may be employed utilizing the calibration vectors. The array calibration vectors may be formed in a generally conventionally manner by obtaining calibration data from the collector elements 18 and from a known or control source location.

The obtained calibration data may be processed by the processor 12 by taking the dominant eigenvector of the covariance data. The normalized eigenvector then may represent one of the array calibration vectors, such as $a_h$. Calibration data may be received and processed for all desired azimuth and depression angle orientations to form both vertical, horizontal, right-circular, left-circular, etc., array calibration vectors. As should be appreciated by those skilled in the art, the present invention may employ any method of forming array calibration vectors, and need not be limited to the particular method discussed above.

The two array calibration vectors may be formed into a matrix, A(θ, φ), to facilitate usage of the vectors by the cost function in step 102 as is described in more detail below. A(θ, φ) may be given by:

$$A(\theta,\phi) = [\vec{a}_v(\theta,\phi) \; \vec{a}_h(\theta,\phi)]_{(n \times 2)} \quad (1)$$

In step 102, an all-polarization cost function is formed utilizing the measurements acquired in step 100. The all-polarization cost function is not dependent on a particular signal polarization and may be utilized in step 104 to calculate the AOA of an emitted signal having any polarization. For example, the cost function may be utilized to calculate the AOA of signals having vertical, horizontal, right-circular, and left-circular polarizations. Thus, the all-polarization cost function may be similar to conventional signal specific cost functions, such as a MLDF cost function, with the exception that the all-polarization cost function of the present invention is not limited to a single polarization.

As is known in the art, a single polarization MLDF cost function ρ may be given by the following equation:

$$\rho_{mldf}(\theta, \phi) = \frac{\vec{a} * (\theta, \phi) Rxx^{-1} \vec{a}(\theta, \phi)}{\vec{w} * \vec{a}(\theta, \phi) \vec{a} * (\theta, \phi) \vec{w}} \quad (2)$$

wherein a is an array calibration vector, Rxx is a time-average data auto correlation matrix, w is a weight vector, θ is azimuth, and φ is depression angle.

Utilizing the weight vector and matrix of horizontal and vertical array calibration vectors acquired in step 100, the present invention is operable to from an all-polarization MLDF cost function given by the following equation:

$$\rho_{ap\_mldf}(\theta, \phi) = \frac{det([A * (\theta, \phi) Rxx^{-1} A(\theta, \phi)]_{2 \times 2})}{(\vec{w} * A(\theta, \phi) A * (\theta, \phi) \vec{w})_{(1 \times 1)}} \quad (3)$$

wherein A is the matrix of horizontal and vertical array calibration vectors acquired in step 100, w is the weight vector acquired in step 100, Rxx is a time-average data auto correlation matrix, θ is azimuth, and φ is depression angle. The denominator of equation (3) generally corresponds to a beam (gain) pattern for a particular weight set and the numerator generally corresponds to a Capon spectrum.

The all-polarization MLDF cost function may alternatively be given by:

$$\rho_{ap\_mldf}(\theta, \phi) = \frac{(\vec{w} * A(\theta, \phi) A * (\theta, \phi) \vec{w})_{(1 \times 1)}}{det([A * (\theta, \phi) Rxx^{-1} A(\theta, \phi)]_{2 \times 2})} \quad (4)$$

wherein A is the matrix of horizontal and vertical array calibration vectors acquired in step 100, w is the weight vector acquired in step 100, Rxx is a time-average data auto correlation matrix, θ is azimuth, and φ is depression angle. Thus, equation (4) is generally the inverse of equation (3).

The time-average data auto correlation matrix Rxx utilized in equations (3) and (4) is generally conventional and is given by the equation:

$$Rij = \frac{Xj * Xi}{N} \quad (5)$$

wherein i and j are sensor indexes, N is the number of time samples collected, and * is a multiplier corresponding to a Hermitian operator for complex value multiplication.

The all-polarization cost function given by equations (3) or (4) is configured for use with signals having any polarization, and is not limited to vertically polarized signals as equation is (2), due to the all-polarization cost function's utilization of measurements, including the matrix of horizontal and vertical array calibration vectors, corresponding to various polarizations. For instance, the cost functions provided herein may be employed by any signal specific DF algorithm, blind signal extract algorithm, etc., and need not be limited to MLDF-type configurations.

As should be appreciated by those skilled in the art, the present invention is not limited to the two cost functions given above by equations (3) and (4), as the present invention may utilize any all-polarization cost function formed utilizing signal measurements generated by a blind signal extraction algorithm. For example, equations (3) and (4) may be modified to utilize calibration vectors corresponding to right-circular and left-circular polarizations, or any other polarization, and are not limited to the horizontal and vertical polarizations expressly utilized above. Thus, variations and modifications of equations (3) and (4) may be employed without departing from the scope of the present invention.

In various embodiments it may be desirable to utilize an all-polarization cost function that includes calibration normalization to further facilitate accurate AOA determination. All-polarization calibration normalized cost functions may be given by the following equations:

wherein equation (6) is similar to the cost function provided by equation (3) but includes the calibration normalizing term det([A(θ,φ)*A(θ,φ)] in its numerator and equation (7) is similar to the cost function provided by equation (4) but includes the calibration normalizing term det([A(θ,φ)*A(θ, φ)] in its denominator.

Utilization of the cost functions provided by equations (6) or (7) limits skewing and inadvertent scaling caused by differences in the normalization of the individual calibration spaces of the array calibration vectors $a_h$ and $a_v$. These differences in normalization of the array calibration vectors may skew results in all-pole configurations due to utilization of the matrix A if calibration normalization is not utilized.

Figure 4:
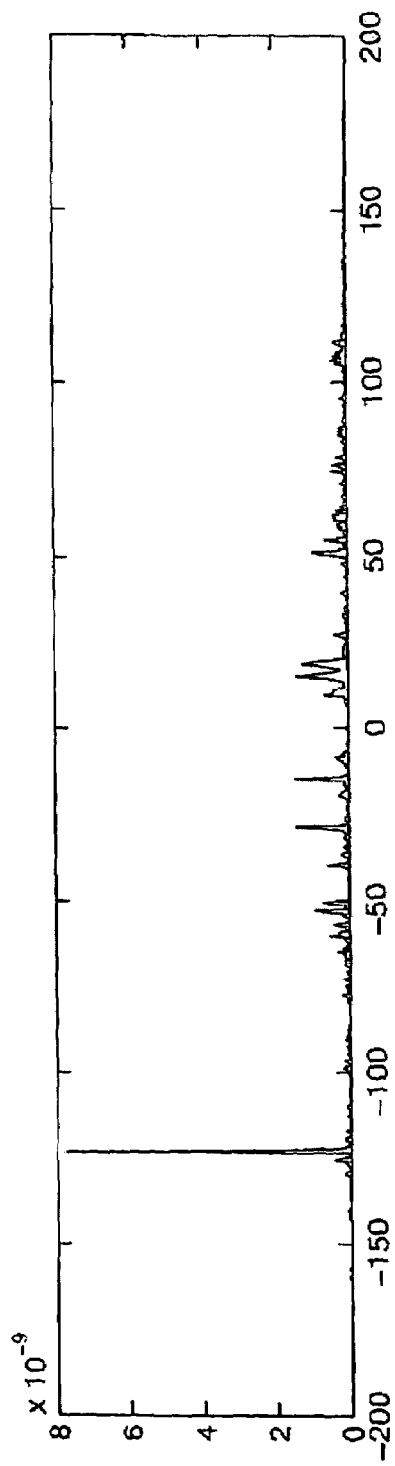
FIG. 4 is a spectrum graph showing an output of an all-polarization MLDF cost function employing calibration normalization, the graph having an x axis representing angle of arrival and a y axis representing magnitude.
Figure 5:
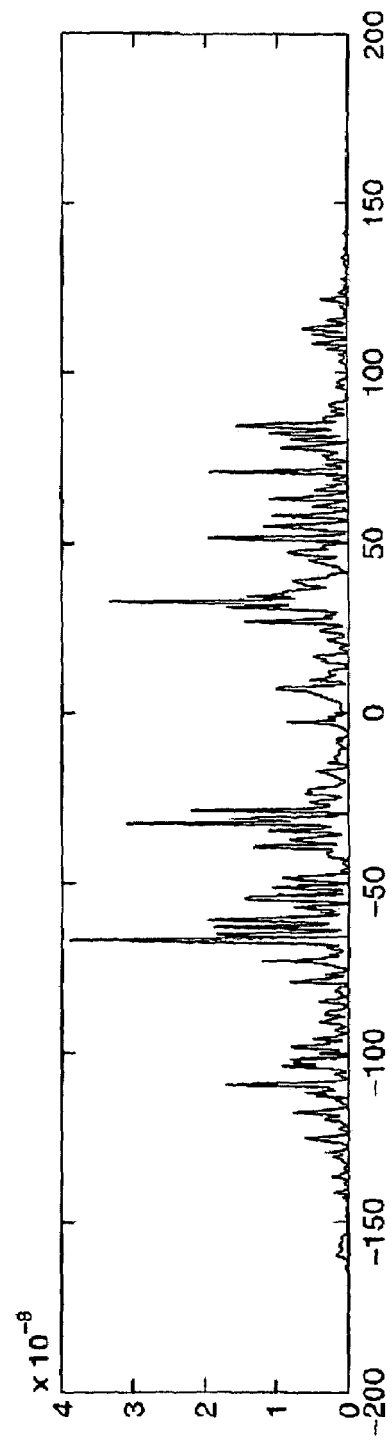
FIG. 5 is a spectrum graph showing an output of an all-polarization MLDF cost function lacking calibration normalization; the graph having an x axis representing angle of arrival and a y axis representing magnitude.
Figure 6:
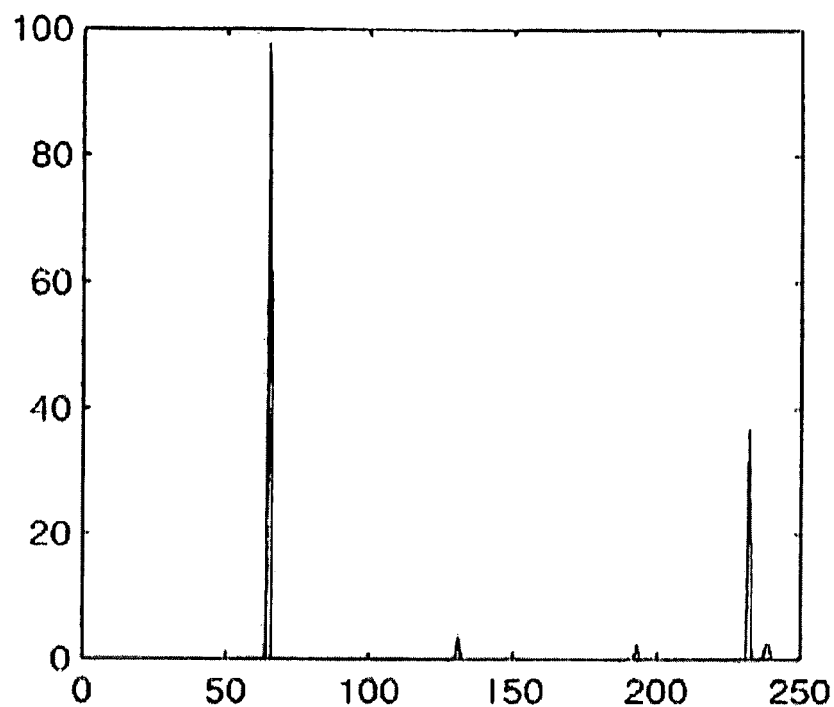
FIG. 6 is an error graph showing Maximum Likelihood Direction Finding (MLDF) error corresponding to the all-polarization cost function of FIG. 4.
Figure 7:
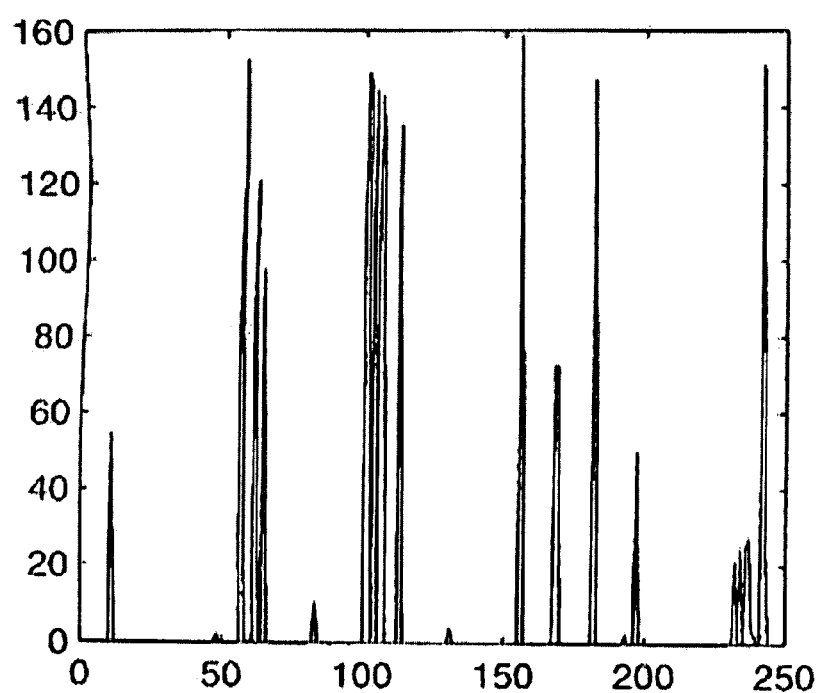
FIG. 7 is an error graph showing Maximum Likelihood Direction Finding (MLDF) error corresponding to the all-polarization cost function of FIG. 5.

FIGS. 4-7 illustrate the functionality of the calibration normalized cost functions in comparison to the all-polarization cost function given by equations (3) and (4). For instance, FIG. 4 illustrates a sample output of the cost function given by equation (7), having calibration normalization, while FIG. 5 illustrates a sample output of the cost function given by equation (4), lacking calibration normalization. As is readily apparent, ambiguous or false maximums are reduced by the calibration normalization of equation (7), thereby facilitating the AOA determination in step 104. Similarly, FIG. 6 illustrates MLDF error for the sample output of equation (7) while FIG. 7 illustrates MLDF error for the sample output of equation (4).

Figure 2:
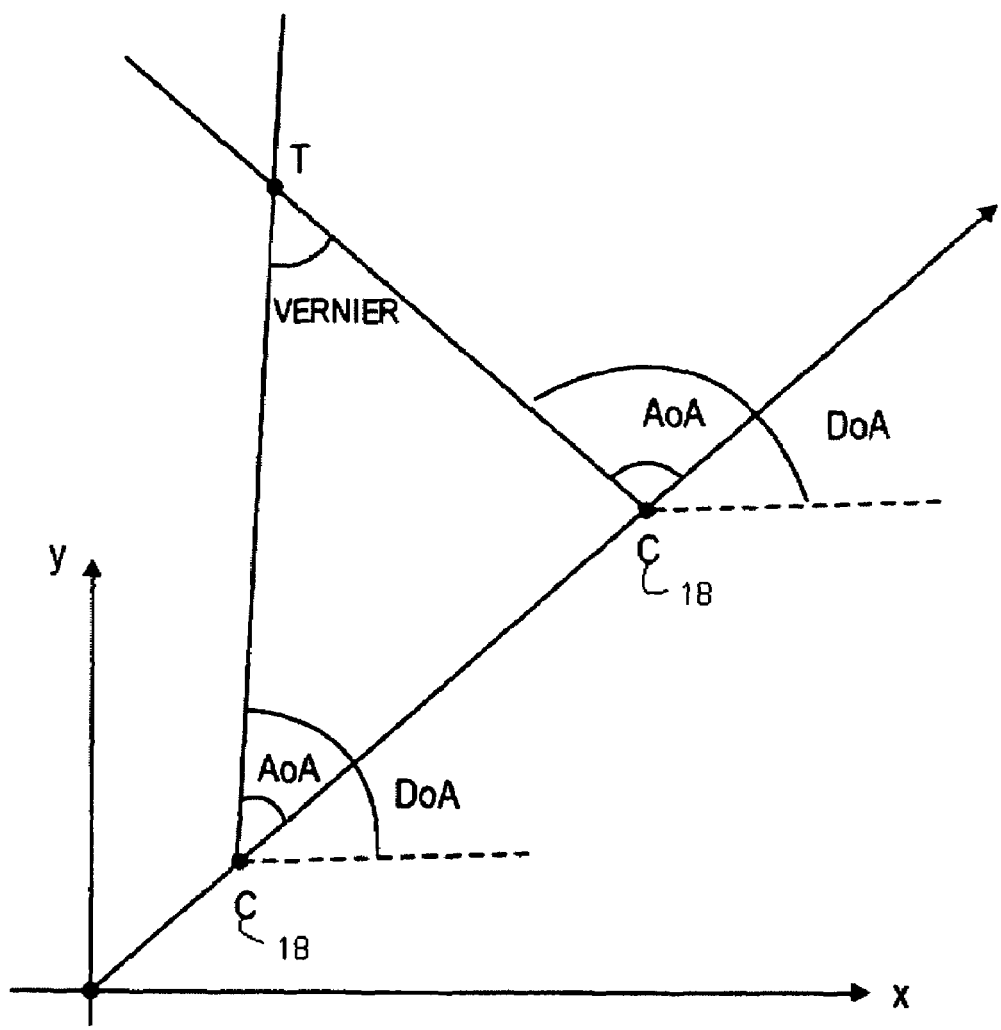
FIG. 2 is a schematic view of various angles formed between a moving collector and a signal-emitting target.

In step 104, the angle of arrival (AOA) of the emitted signal is determined utilizing the cost function or functions formed in step 102. As shown in FIG. 2, AOA refers to the angle formed between the source of the emitted signal and the collector element relative to the collector element. As should be appreciated, the cost function may be utilized to determine a direction of arrival (DOA) instead of the AOA by providing a reference point for the AOA calculation.

The AOA of the emitted signal is preferably determined by calculating a minimum of the all-polarization cost function formed in step 102 and given by equation (6) or (3). The denominator of the all-polarization cost function is a measure of the projection of the weight vector w onto the calibration matrix A. The denominator will be maximized when the weight vector w is closest to the calibration matrix A, and thus contributes to the minimum of the cost function. In the numerator of the cost function, $Rxx^{-1}$ is similar to known $E E^*_N$ terms in MUSIC cost functions. Since all eigenvalues of Rxx are positive and the eigenvalues associated with the noise subspace are the smallest ones, the noise eigenvalues and vectors will be largest component of $Rxx^{-1}$. Thus, the numerator will be minimized when the calibration matrix A is orthogonal to the noise subspace.

Thus, the minimum of the cost function formed in step 102 and given by equation (6) or (3) generally corresponds to the AOA of the emitted signal. In alternative embodiments where $$\rho_{ap\_mldf}(\theta, \phi) = \frac{det([A(\theta, \phi) * A(\theta, \phi)] \diamond det([A * (\theta, \phi) Rxx^{-1} A(\theta, \phi)]_{2 \times 2})}{(\vec{w} * A(\theta, \phi) A * (\theta, \phi) \vec{w})_{(1 \times 1)}} \quad (6)$$

$$\rho_{ap\_mldf}(\theta, \phi) = \frac{(\vec{w} * A(\theta, \phi) A * (\theta, \phi) \vec{w})_{(1 \times 1)}}{det([A(\theta, \phi) * A(\theta, \phi)] det([A * (\theta, \phi) Rxx^{-1} A(\theta, \phi)]_{2 \times 2})} \quad (7)$$

equation (7) or (4) is utilized as the cost function, the maximum of the cost function is acquired to determine the AOA of the emitted signal. As existing cost function search and optimization algorithms function best on roughly parabolic surfaces, and the minimum of equations (6) and (3) corresponds to a roughly parabolic surface, utilization of the cost function provided by equation (6) or (3) is generally preferable over utilization of the cost function provided by equations (7) or (4). However, any of the cost functions described herein and variations thereof may be employed by the present invention to determine AOA by finding any combination of maximums or minimums.

Determination of the AOA is further facilitated by the cost function as ambiguities at angles not corresponding to the AOA are suppressed by the beam pattern which is formed from vector matrix A and the weight vector w and calibration normalization which is utilized by equations (6) and (7). Such suppression of ambiguous angles enables rapid determination of minimums and maximums of the cost function employed by the present invention utilizing various optimization and search methods provided in the art.

In various embodiments it may be desirable to interpolate portions of the cost function or results acquired utilizing the cost function to ensure accurate and reliable AOA determinations. For instance, a calibration or interpolation model may be utilized to form the array calibration vectors and/or the array calibration matrix. The calibration and interpolation models enable the cost function to provide a continuous function of $\theta$ and $\phi$ even though measurements exist only at discrete azimuths and depression angles. The calibration model may be formed in a generally conventional manner, such as by utilizing a calibration model similar to those utilized in single-polarization MLDF algorithms or MUSIC algorithms.

The AOA determined utilized the cost function of step 102 may be retained with the memory 16 for later use by the computing element 10, transmitted to the communications network 12 for utilized by devices coupled with the communications network 12, provided to a user utilizing visual or audio elements, transmitted to the source of the emitted signal to facilitate location determination, provided to computer programs or devices coupled with the computing element 10, combinations thereof, etc. Similarly, the cost function provided in step 102 may be utilized by any signal specific DF algorithms to efficiently determine AOA.

Although the invention has been described with reference to the preferred embodiment illustrated in the attached drawing figures, it is noted that equivalents may be employed and substitutions made herein without departing from the scope of the invention as recited in the claims. For example, each of the various equations provided herein may be replaced or substituted with innumerable variations and general equivalents.

Having thus described the preferred embodiment of the invention, what is claimed as new and desired to be protected by Letters Patent includes the following:

1. A method of determining an angle of arrival for an emitted signal having any polarization, the method comprising:

acquiring measurements at least partially corresponding to the emitted signal and generated utilizing a blind signal extraction algorithm, wherein the measurements include a weight vector and include calibration measurements comprising a matrix having vertical and horizontal array calibration vectors, the matrix being at least partially represented by the equation:

$$A(\theta,\phi) = [\vec{a}_v(\theta,\phi)\ \vec{a}_h(\theta,\phi)]_{(n \times 2)}$$

wherein $\vec{a}_v$ is the vertical array calibration vector, $\vec{a}_h$ is the horizontal array calibration vector, $\theta$ is an azimuth, and $\phi$ is a depression angle;

forming an all-polarization cost function utilizing the acquired measurements, wherein the all-polarization cost function is at least partially represented by the equation:

$$\rho_{ap\_mldf}(\theta, \phi) = \frac{det([A*(\theta,\phi) R_{xx}^{-1} A(\theta,\phi)]_{2\times 2})}{(\vec{w} * A(\theta,\phi) A*(\theta,\phi)\vec{w})_{(1\times 1)}}$$

wherein A is the matrix, $\vec{w}$ is the weight vector, Rxx is a time-average data auto correlation matrix, $\theta$ is an azimuth, and $\phi$ is a depression angle; and determining the angle of arrival for the emitted signal utilizing the formed all-polarization cost function.

2. The method of claim 1, wherein the all-polarization cost function is formed to include calibration normalization.

3. The method of claim 1, wherein the angle of arrival is determined by acquiring a maximum of the all-polarization cost function.

4. The method of claim 1, wherein the angle of arrival is determined by acquiring a minimum of the all-polarization cost function.

5. The method of claim 1, wherein the cost function is operable to be utilized by a signal specific direction finding algorithm.

6. The method of claim 5, wherein the signal specific direction finding algorithm corresponds to a Maximum Likelihood Direction Finding (MLDF) algorithm.

7. A computer program for determining an angle of arrival for an emitted signal having any polarization, the computer program stored on a computer-readable medium for operating a computing element and comprising:

a code segment operable to acquire measurements at least partially corresponding to the emitted signal and generated utilizing a blind signal extraction algorithm, wherein the measurements include a weight vector and include calibration measurements comprising a matrix having vertical and horizontal array calibration vectors, the matrix being at least partially represented by the equation:

$$A(\theta,\phi) = [\vec{a}_v(\theta,\phi)\ \vec{a}_h(\theta,\phi)]_{(n \times 2)}$$

wherein $\vec{a}_v$ is the vertical array calibration vector, $\vec{a}_h$ is the horizontal array calibration vector, $\theta$ is an azimuth, and $\phi$ is a depression angle;

a code segment operable to form an all-polarization cost function utilizing the acquired measurements, wherein the all-polarization cost function is at least partially represented by the equation:

$$\rho_{\text{ap\_mldf}}(\theta, \phi) = \frac{det([A*(\theta, \phi)Rxx^{-1}A(\theta, \phi)]_{2\times 2})}{(\vec{w}*A(\theta, \phi)A*(\theta, \phi)\vec{w})_{(1\times 1)}}$$

wherein A is the matrix, $\vec{w}$ is the weight vector, Rxx is a time-average data auto correlation matrix, $\theta$ is an azimuth, and $\phi$ is a depression angle; and
a code segment operable to determine the angle of arrival for the emitted signal utilizing the formed all-polarization cost function.

8. The computer program of claim 7, wherein the code segment forms the all-polarization cost function to include calibration normalization.

9. The computer program of claim 7, wherein the code segment determines the angle of arrival by acquiring a minimum of the all-polarization cost function.

10. The computer program of claim 7, wherein the cost function is operable to be utilized by a signal specific direction finding algorithm.

11. The computer program of claim 10, wherein the signal specific direction finding algorithm corresponds to a Maximum Likelihood Direction Finding (MLDF) algorithm.

12. A computing element operable to determine an angle of arrival for an emitted signal having any polarization, the computing element comprising:
a memory operable to store measurements at least partially corresponding to the emitted signal and generated utilizing a blind signal extraction algorithm, wherein the measurements include a weight vector and include calibration measurements comprising a matrix having vertical and horizontal array calibration vectors, the matrix being at least partially represented by the equation:

$$A(\theta,\phi) = [\vec{a}_v(\theta,\phi)\ \vec{a}_h(\theta,\phi)]_{(n\times 2)}$$

wherein $\vec{a}_v$ is the vertical array calibration vector, $\vec{a}_h$ is the horizontal array calibration vector, $\theta$ is an azimuth, and $\phi$ is a depression angle; and
a processor coupled with the memory and operable to—
form an all-polarization cost function utilizing the stored measurements,
wherein the all-polarization cost function is at least partially represented by the equation:

$$\rho_{\text{ap\_mldf}}(\theta, \phi) = \frac{det([A*(\theta, \phi)Rxx^{-1}A(\theta, \phi)]_{2\times 2})}{(\vec{w}*A(\theta, \phi)A*(\theta, \phi)\vec{w})_{(1\times 1)}}$$

wherein A is the matrix, $\vec{w}$ is the weight vector, Rxx is a time-average data auto correlation matrix, $\theta$ is an azimuth, and $\phi$ is a depression angle; and
determine the angle of arrival for the emitted signal utilizing the formed all-polarization cost function.

13. The computing element of claim 12, wherein the processor forms the all-polarization cost function to include calibration normalization.

14. The computing element of claim 12, wherein the processor determines the angle of arrival by acquiring a minimum of the all-polarization cost function.

15. The computing element of claim 12, wherein the cost function is operable to be utilized by a signal specific direction finding algorithm.

16. The computing element of claim 15, wherein the signal specific direction finding algorithm corresponds to a Maximum Likelihood Direction Finding (MLDF) algorithm.

* * * * *